United States Patent [19]
Goebel

[11] Patent Number: 5,901,316
[45] Date of Patent: *May 4, 1999

[54] FLOAT REGISTER SPILL CACHE METHOD, SYSTEM, AND COMPUTER PROGRAM PRODUCT

[75] Inventor: Kurt J. Goebel, Mountain View, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,521

[22] Filed: Jul. 1, 1996

[51] Int. Cl.$^6$ .............................. G06F 12/08; G06F 9/44
[52] U.S. Cl. ........................ 395/705; 395/701; 395/562; 395/563
[58] Field of Search ............................. 395/800.23, 569, 395/563, 393, 800.41, 394, 566, 588, 674, 678, 705, 562, 800.32, 580, 672, 677; 711/202, 117, 118; 364/715.03, 748.16, 748.19, 748.13, 749

[56] References Cited

U.S. PATENT DOCUMENTS

| | | | |
|---|---|---|---|
| 4,571,678 | 2/1986 | Chaitin ..................................... | 395/707 |
| 4,680,701 | 7/1987 | Cochran ............................... | 395/800.4 |
| 4,763,255 | 8/1988 | Hopkins et al. ........................ | 395/709 |
| 4,782,444 | 11/1988 | Munshi et al. .......................... | 395/709 |
| 5,027,272 | 6/1991 | Samuels ................................... | 395/566 |
| 5,233,691 | 8/1993 | Ando et al. ............................. | 395/872 |
| 5,249,295 | 9/1993 | Briggs et al. ............................ | 395/709 |
| 5,268,855 | 12/1993 | Mason et al. ...................... | 364/748.19 |
| 5,418,958 | 5/1995 | Goebel .................................... | 395/709 |
| 5,481,706 | 1/1996 | Peek ......................................... | 395/726 |
| 5,590,329 | 12/1996 | Goodnow, II et al. .................. | 395/708 |
| 5,631,859 | 5/1997 | Markstein et al. .................. | 364/748.19 |
| 5,729,748 | 3/1998 | Robbins et al. ......................... | 395/705 |

FOREIGN PATENT DOCUMENTS 0 051 131  9/1981  European Pat. Off. .

OTHER PUBLICATIONS

David L. Weaver et al., "The SPARC Architecture Manual," Prentice Hall (1994), Version 9, pp. 294–298.
Alfred V. Aho et al., "Compilers Principles, Techniques and Tools," Addison–Wesley (1988), Chapter 8, pp. 463–512.
ACM Transactions On Programming Languages, vol. 12, No. 4, Oct. 1990, New York, NY, US, pp. 501–536, Fred C. Chow and John L. Hennessy: "The Priority–Based Coloring Approach to Register Allocation", Sections 2, 3.4, 5 and 9.
Computer Languages, vol. 6, 1981, pp. 47–57, Gregory J. Chaitin et al : "Register Allocation Via Coloring".

*Primary Examiner*—James P. Trammell
*Assistant Examiner*—Cuong H. Nguyen
*Attorney, Agent, or Firm*—Robert P. Sabath; Edward B. Weller

[57] ABSTRACT

A float register spill cache method for improving the efficiency of usage of floating point single precision registers computer using a microprocessor conforming to the SPARC-V9 architecture specification. Values are temporarily stored in a plurality of double precision registers which are utilized as a float spill cache having a plurality of float spill slots. Values are generally shifted from one of the single precision registers to a second single precision register which is used as a spill pad, and then from the spill pad to a selected one of the float spill slots.

19 Claims, 5 Drawing Sheets

FLOAT REGISTER SPILL CACHE METHOD, SYSTEM, AND COMPUTER PROGRAM PRODUCT

TECHNICAL FIELD

The present invention relates to the field of computer microprocessor architecture and the efficient application and usage thereof, and more specifically to an improved method and means for the efficient usage of floating point registers. The predominant current usage of the present inventive float register spill cache is in computers utilizing Scalable Processor ARCHITECTURE ("SPARC") and like configurations wherein certain double precision registers may be underutilized when accomplishing single precision operations.

BACKGROUND OF THE INVENTION

Register spilling is an expensive operation in that it is comparatively slow in an environment where operational speed is the primary goal in the design of computer architectures, and in software intended to take full advantage of such architectures. In general, register spilling involves the movement of register contents from the CPU's register file to a much slower and less efficiently accessed secondary storage medium. Register spilling occurs when, because all available registers are in use, it is necessary to insert instructions in generated code to store the content of a register into a memory location. This is done in order to free up the register for allocation to a computation. Because of the inherent cost of register spilling, much effort has been directed toward the allocation and usage of registers, with one of the principle goals of such effort being the minimization of the necessity to spill registers. An example of such an effort is found in U.S. Pat. No. 5,418,958, entitled *Register Allocation by Decomposing, Re-Connecting and Coloring Hierarchical Program Regions*, issued to the present inventor.

Figure 1:
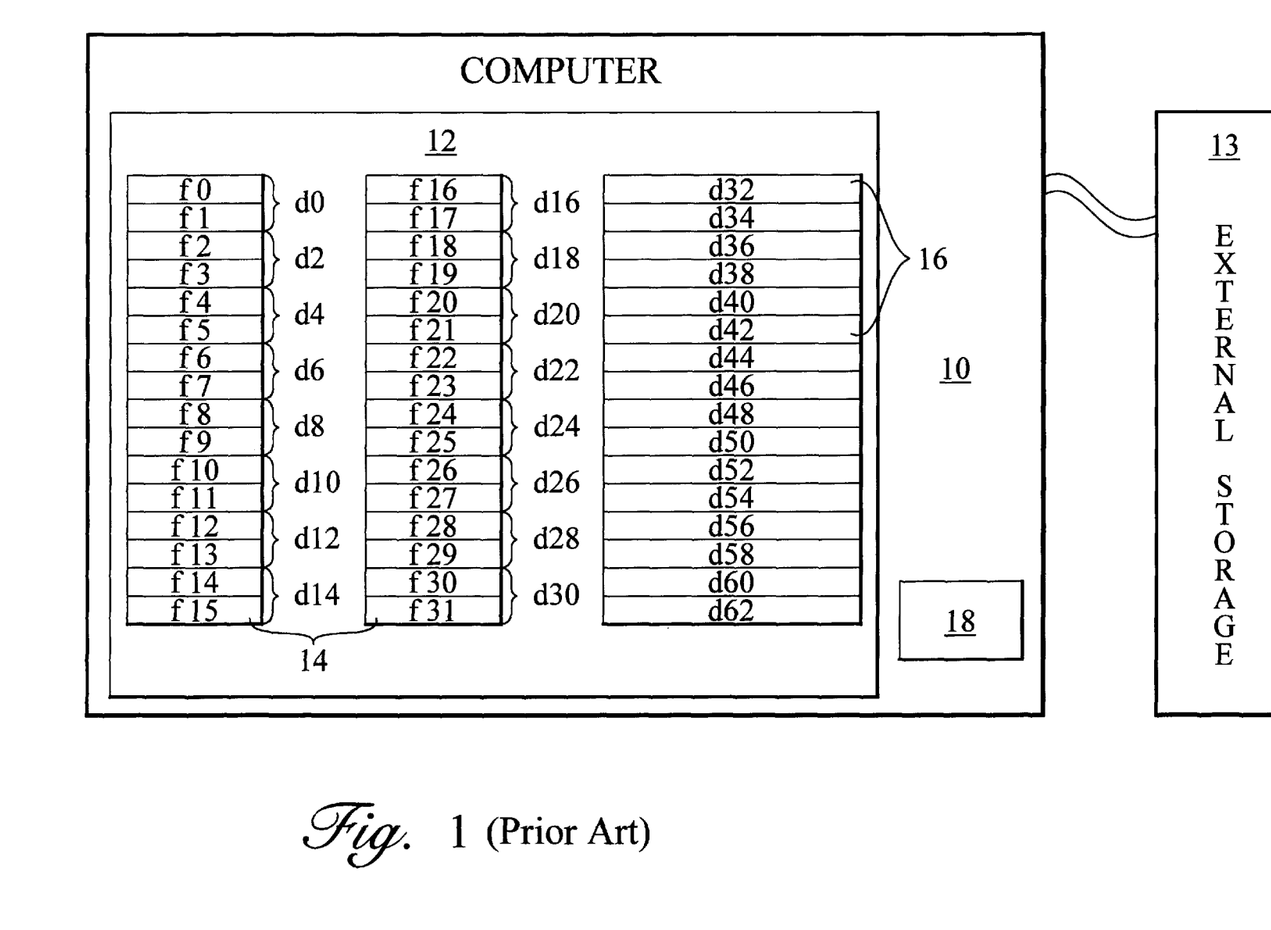
FIG. 1 is a logical diagrammatic representation of a computer according to the existing prior art SPARC-V9 specification, showing only those details of the SPARC-V9 architecture which are necessary to the disclosure of the present invention.

SPARC-V9 is a microprocessor specification created by the SPARC Architecture Committee of SPARC International. SPARC-V9 is not a specific chip. Rather, it is an architectural specification that can be implemented as a microprocessor by anyone securing a license from SPARC International. FIG. 1 depicts an aspect of the SPARC architecture in diagrammatic form. A computer 10 has therein a microprocessor 12. One skilled in the art will recognize that the microprocessor 12 is greatly out of proportion in the diagrammatic view of FIG. 1, and only a few relevant logical components of the microprocessor 12 are illustrated therein, in order to better illustrate the aspects of the computer 10 which are relevant to this present disclosure. The computer 10 will generally be equipped with a number of ordinary peripheral devices, such as a monitor, a keyboard, and the like, and such peripheral devices will include an external memory device 13 for transferring programs and data into and out of the computer 10. The external memory device 13 can be any of a great number of different device types, such as a floppy disk drive, a hard disk drive, a CD ROM drive, or the like. Also, it should be noted that, although the microprocessor 12 is illustrated in the view of FIG. 1 as an integral unit, it is not required by the SPARC-V9 specification that the SPARC-V9 architecture be implemented in a single chip.

The V9 version of the SPARC architecture defines thirty two (32) single precision (32 bit) floating point registers 14 which are designated as %f0 through %f31 inclusive, and thirty two (32) double precision (64 bit) floating point registers 16 designated as %d0 through %d62 inclusive. The first sixteen (16) double precision registers 16 overlap with the thirty two (32) single precision registers 14 such that each double precision register 16 corresponds to and uses the same physical or logical memory as two of the single precision registers 14. For example, the double precision floating point register 16 designated %d0 overlaps with the two single precision registers 14 which are designated as %f0 and %f1. The second sixteen (16) double precision registers 16 do not overlap with the single precision registers 14. The first sixteen (16) double precision registers 16 are designated by even address numbers %d0, %d2, %d4 . . . %d30, while the second sixteen (16) double precision registers 16 are designated herein by even address numbers %d32, %d34, %d36 . . . %d62. This arrangement is discussed in more detail in The SPARC Architecture Manual edited by David L. Weaver and Tom Germond and published by PTR Prentice Hall under the auspices Of SPARC INTERNATIONAL (ISBN#0-13-099227-5). It should be noted that the terms "single precision" and "double precision" are sometimes susceptible to different definitions. As used herein, these terms will be synonymous with "low precision" and "high precision", whether low and high precision are defined as being single and double precision, respectively, or double and quad precision respectively, or the like.

A stack memory 18 is also included in the computer 10, as depicted in the logical diagrammatic view of FIG. 1. As used herein, the term "stack memory" is intended to refer to that portion of a memory unit which is allocated as a "run time memory". An example of a typical register spill to and reload from the stack memory 18 might be annotated as follows:

spill:
    st %f2,[%sp+92]
reload:
    Id [%sp+92], %f10
where;

'st' and 'Id' are the spill and reload commands, respectively;

%sp is stack pointer location—in this example, the %sp+92 indicates a stack memory location of %sp+92—this memory location is an example only and is of no articular significance;

%f# (where "#" represents an integer) defines a single precision floating point register 14 having a size of 4 bytes such that, in the example above, the single precision floating point register %f2 is depicted as being first spilled into the memory stack 18 at location sp+92, and then the data in location sp+p2 is reloaded into the single precision floating point register %f10.

According to the SPARC-V9 architecture, single precision arithmetic operations may only be applied to operand within the single precision registers 14. Furthermore, the result of single precision arithmetic operations may only write to the single precision registers 14. Therefore, when only single precision arithmetic operations are being accomplished, or during a combination of single precision and double precision arithmetic operations which is weighted toward the single precision operations, the double precision registers 16 will be underutilized, while the available quantity of single precision registers 14 may be insufficient to prevent the necessity for excessive register spilling.

To the inventor's knowledge, no prior art method or means exist for allowing the use of the double precision registers 16 to augment the simple precision registers 14.

Indeed, since the SPARC-V9 specification specifically disallows the writing of single precision data to the double precision registers 16, it would seem to run counter to both intuition and the intent of the SPARC-V9 creators to accomplish this.

SUMMARY OF THE INVENTION

Accordingly, the present invention is intended to provide improved processing speed during single precision arithmetic operations in a SPARC-V9 based computer, or in any computer which includes the relevant aspects of the SPARC-V9 architecture as described herein. This is accomplished by providing for the use of double precision registers to hold single precision data.

Briefly, the preferred embodiment of the present invention is a method for operating a microprocessor which is, ultimately, embodied in code for controlling such microprocessor when such code is generated by a compiler. The inventive method allows for the use of available underutilized double precision registers to contain single precision data in excess of that which can readily be accommodated by available single precision registers. Since adjacent pairs of available single precision registers can be addressed as double precision registers, data is moved from such a pair of single precision registers for temporary storage in a double precision register and is moved from such double precision register to such pair of single precision registers when required to complete a single precision arithmetic operation by the microprocessor. This may generally require two sets of moves; a first move from single precision register(s) wherein the data is originally stored to the particular adjacent pair of single precision registers from which the data is to be transferred to the double precision registers—and a second move from the particular adjacent pair of single precision registers to the double precision register which is to be used as temporary storage for the data. However, additional increases in performance are accomplished by avoiding the necessity for two separate moves, where appropriate, as will be described in further detail hereinafter.

According to the present invention, underutilized resources are more fully utilized and performance of the computer is thereby increased. The present inventive method is fully compatible with the SPARC-V9 architecture specification, with hardware built according to such specification, and with software designed for use therewith.

These and other aspects of the present invention will become clear to those skilled in the art in view of the description of the best presently known mode of carrying out the invention and the industrial applicability of the preferred embodiment as described herein and as illustrated in the several figures of the drawing.

DESCRIPTION OF THE PREFERRED EMBODIMENT

The following detailed description illustrates the invention by way of example, not by way of limitation of the principles of the invention. The best presently known mode for carrying out the invention is a float register spill cache method. The inventive float register spill cache method is depicted in the flow diagram of FIG. 2 and is designated therein by the general reference character 20. FIG. 3 is a logical diagrammatic representation, similar to the view of FIG. 1, depicting resource allocation of the computer 10 according to the present invention. As designated in the view of FIG. 3, according to the present inventive method 20, the second set of double precision registers 16 (those which are designated by even numbers %d32 through %d62 and which are not common with the single precision registers 14) are a float spill cache 22. Those double precision registers 16 which are within the float spill cache 22 are designated as float spill slots 24.

According to the present inventive method 20, the float spill cache 22 will be viewed by a compiler as yet another medium to which a value can be spilled. Use of the float spill cache 22 will not be as fast as simple use of the single precision (float) registers 14 alone, as the spill cache 22 is not directly accessible by the single precision functional units of the computer 10. However, since data can be written to and retrieved from the float spill cache 22 much faster than data can be written to and retrieved from the memory stack 18, there is a significant savings in time as compared to register spilling to the memory stack 18. In this respect, like the conventional prior art spills to the memory stack 18 described previously herein—wherein float values are saved from the single precision registers 14 to the memory stack 18, according to the inventive float register spill cache method 20, spilled float values are saved in a float spill slot 24 and later retrieved from the same float spill slot 24 when needed.

Figure 2:
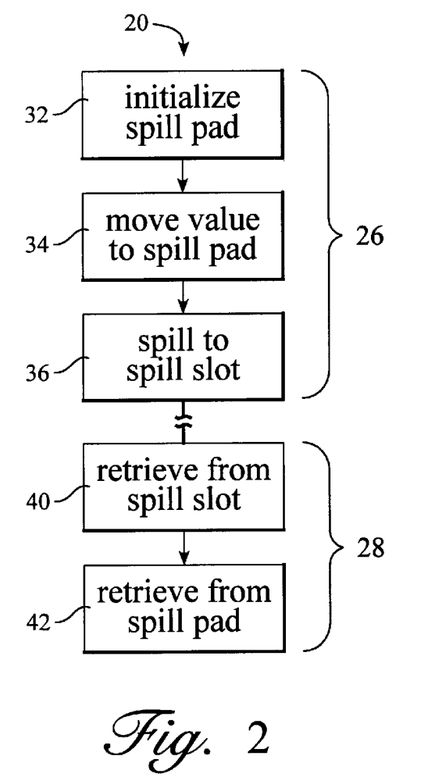
FIG. 2 is a block flow diagram of the best presently known embodiment of the present inventive method.
Figure 3:
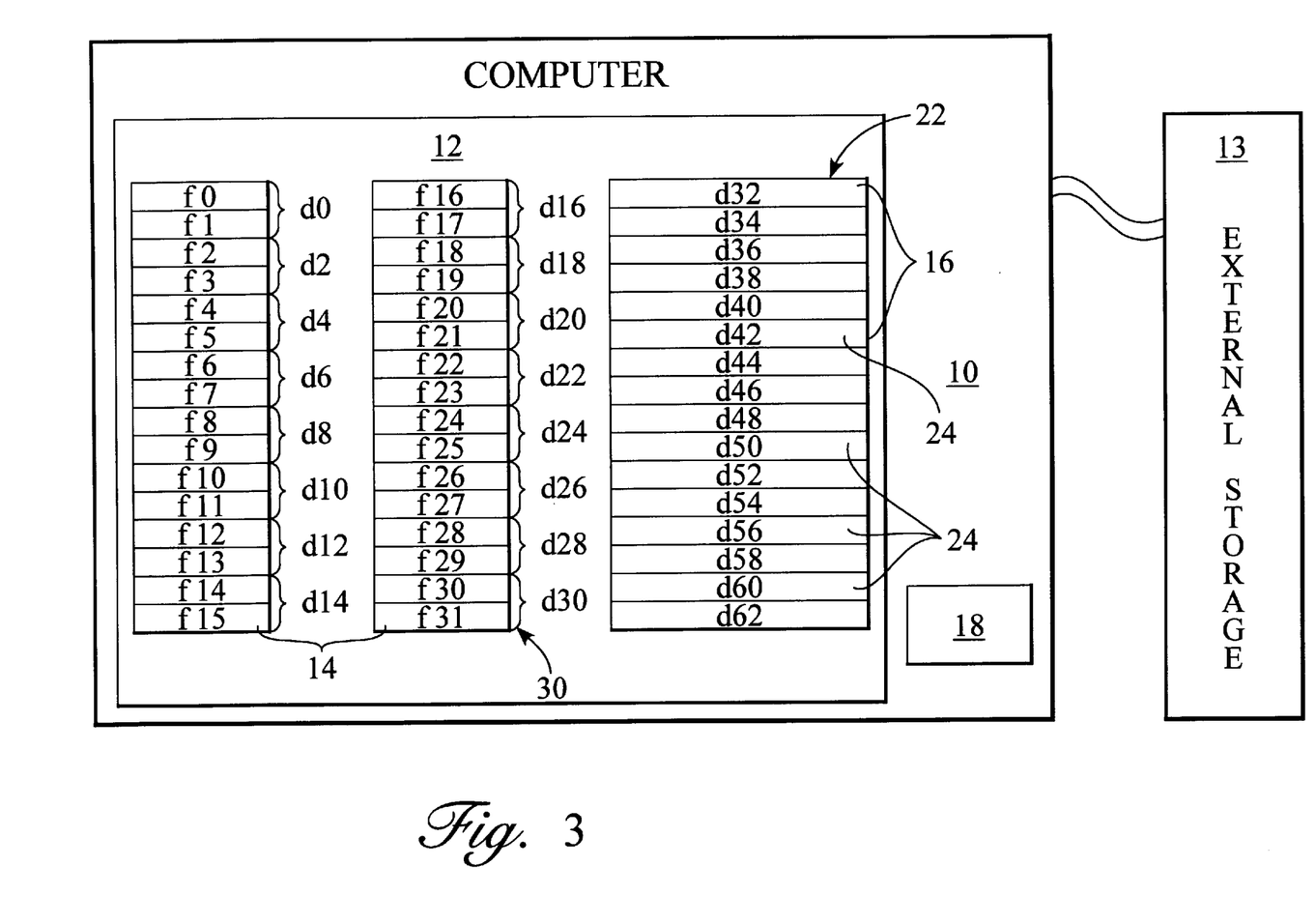
FIG. 3 is a logical diagrammatic representation, similar to the view of FIG. 1, depicting resource allocation of the computer according the present invention.

Returning to the view of FIG. 2, in accordance with the general description above, the basic float register spill cache method 20 has a "spill" operation 26 and a "retrieve" operation 28. According to the example of FIG. 2, one of the double precision registers 16 which coexists with a pair of the single precision registers 14 is designated as a spill pad 30. Reference to FIG. 3 reveals that the spill pad 30 is the double precision register 16 which is designated as %d30, although any of the double precision registers 16 between %d0 and %d30, inclusive, could be so designated. Also, in the example of FIG. 2, data will be saved to and retrieved from the float spill slot 24 which is designated as %d62, although the same example could be applied to any of the float spill slots 24 within the float spill cache 22. In light of the above discussion, it can be recognized that each of the float spill slots 24 has the capacity to contain the content of two of the single precision registers 14. In order to fully utilize this capacity, "an initialize spill pad" operation 32 initializes the spill pad 30 to the value contained in the particular spill slot 24. As discussed above, for purposes of this example the particular spill slot 24 is that one which is designated as %d62. This could be annotated as: fmovd %d62, %d30, meaning move the floating point value from the double precision register 16 (%d62) to the double precision register 16 (%d30).

Next within the "spill" operation 26, according to the present inventive method, is a "move value to spill pad" operation 34, wherein the value of the single precision register 14 to be spilled is moved to the spill pad 30. In the present example, wherein the single precision register 14 to be spilled is that one which is designated as %f2, this can be annotated as: fmovs %f5, %f30. As can be seen in the view of FIG. 3, the single precision register 14 designated as %f30 coincides with the spill pad 30. It will be noted that the other single precision register 14 within the spill pad 30 (that one which is designated as %f31) can be used in addition to or instead of the particular one chosen for this present example. As with all such choices, which particular addresses are being written to or retrieved from are chosen by the computer 10 according to the needs of the particular operation being performed thereby. Which particular address is used in relation to a particular operation is generally beyond the scope of the present invention, except as specifically disclosed herein, and such choices will be within the understanding of one skilled in the art.

To finish the "spill" operation 26, the new value of the spill pad 30, now containing the value of the spilled single precision register 14 designated %f2, is moved into the chosen float spill slot 24 (which, in this example is the float spill slot 24 designated %d62) in a "spill to spill slot" operation 36. This can be annotated as: fmovd %d30, %d62.

One skilled in the art will now recognize that the "spill" operation 26, as described previously herein, will result in only that portion of the float spill slot 24 which corresponds to the changed value of the spill pad 30 (as modified to contain the value of the particular %f2 floating point register 14) is changed, while the remainder of the float spill slot 24 has been reloaded to contain the same value which it contained at the outset of the "spill" operation 26. Therefore, each of the float spill slots 24 can achieve its capacity of containing the values of two of the single precision registers 14.

As yet another example, a sample of the "spill" operation 26 spilling the content of the single precision register 14 designated %f5 to the other half of the same float spill slot 24 (%d62), would be annotated as:

fmovd %d62, %d30
    fmovs %f5, %f31
    fmovd %d30, %d62

The "retrieve" operation 28 is accomplished when the computer 10 requires the data previously spilled to one of the float spill slots 24 in the "spill" operation 26. It will be recognized that, while both the "spill" operation 26 and the "retrieve" operation 28 are required to complete the present basic example of the float register spill cache method 20, the float register spill cache method 20 will generally not be performed continuously. There may, in fact, be several iterations of the "spill" operation 26 followed by several iterations of the "retrieve" operation 28. That is, data is spilled as space is need, and retrieved as the data is needed by the computer 10. It may be necessary to spill data several times before it is necessary to retrieve any of the data which has been spilled.

In a "retrieve from spill slot" operation 40 the content of the particular spill slot 24 required (%d62 in the present example) is moved to the spill pad 30. This is annotated: fmovd %d62, %d30. Then, in a "retrieve from spill pad" operation 42, the particular single precision register 14 being loaded (%f10 in the present example), is loaded from the single precision register 14 within the spill pad 30 which contains the required data. In the present example, this is assumed to be the single precision register 14 designated %f30. This is annotated: fmovs %f30, %f10.

Figure 4:
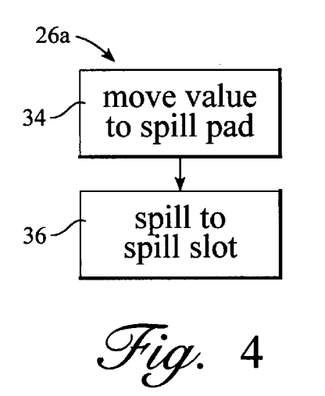
FIG. 4 is a block flow diagram of a first optimized spill operation.

As can be appreciated in light of the flow diagram of FIG. 2 and the related disclosure herein, according to the best presently known embodiment 20 of the present invention, the value of any of the single precision registers 14 can, in effect, be individually spilled to and retrieved from any of the float spill slots 24, while each of the float spill slots 24 can still hold its full capacity of the equivalent of two of the single precision registers 14, even though it is not possible to move individual values directly from only one single precision register 14 into one of the float spill slots 24. In order to achieve both of these objectives, in the example of the best presently known embodiment 20 of the present invention, three moves are required to spill data from a single precision register 14 to a float spill slot 24. In certain circumstances, it is possible to further optimize this procedure, as follows: When it can be determined, as through program data flow analysis or other means not presently specifically contemplated, that a half of a float spill slot 24 is not currently in use ("live") then it is not necessary to accomplish the "initialize spill pad" operation 32 and that operation can be omitted. That is, the only purpose of the "initialize spill pad" operation 32 is to preserve needed data in the half of the float spill slot 24 which is not currently being written to—if there is no specific data stored in that location, then the "initialize spill pad" operation 32 becomes unnecessary. An example of such a first "optimized spill" operation 26a is depicted in FIG. 4 and would be annotated as follows where data is to be spilled from the single precision register 14 (%f2) to the float spill slot 24 (%d62) and where it is known that the float spill slot 24 (%d62) does not already contain data that will later have to be reloaded to one of the single precision registers 14:

fmovs %f2, %f30
    fmovd %d30, %d62

Figure 5:
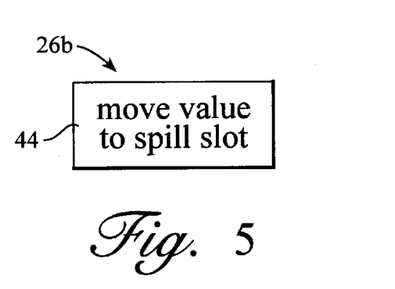
FIG. 5 is a block diagram of a second optimized spill operation.

Where, as in the specific example just discussed, the selected single precision register 14 (%f2 in the above example) happens to be the first of its respective pair of single precision registers 14 coexisting with a double precision register 16 (%d2 in the above example), and further where the "move value to spill pad" operation 34 would move the data into the first single precision register 14 within the spill pad 30 (%f30 in the above example) such that the first undivided part of the selected float spill slot 24 would be utilized, then the data can be moved directly from the single precision register 14 to the selected float spill slot 24 in a second "optimized spill" operation 26b having only a "move value to spill slot" operation 44 therein, as illustrated in the diagram of FIG. 5. This would be annotated as follows: fmovd %d2, %d62.

The second optimized spill operation 26b is also applicable where the selected single precision register 14 happens to be the second of its respective pair of single precision registers 14 (such as %f1 or %f3), and further where the "move value to spill pad" operation 34 would move the data into the second single precision register 14 within the spill pad 30 (%f31) such that the second undivided part of the selected float spill slot 24 would be utilized, and further where no needed data is already stored in the float spill slot 24 into which the spill is to be made.

Figure 6:
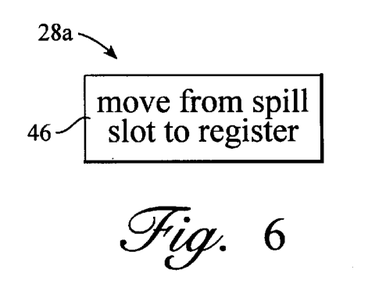
FIG. 6 is a block diagram of an optimized retrieve operation.

FIG. 6 diagrammatically represents an "optimized retrieve" operation 28a. In the first "retrieve operation" 28, previously discussed in relation to FIG. 2, it is contemplated that the move of data from the double precision float spill slot 24 to the single precision registers 14 will cause two of the single precision registers 14 to be redefined, it is generally necessary to insure that whichever single precision register 14 which is thus redefined and which is not the one which is specifically intended to be reloaded, is reloaded to contain its original value, thereby necessitating the two distinct retrieve (move) operations within the "retrieve" operation 28. Where it is determined that the single precision register 14 which is to be redefined but which is not the one which is specifically intended to be reloaded does not contain pertinent data, then the "optimized retrieve" operation 28a, having therein a single "move from spill slot to register" operation 46 can be utilized. This is annotated as: fmovd %d62, %d10 where the move is from the float spill slot 24 (%d62) to the double precision register 16 (%d10), and could be applied either when it is intended that data be moved into the single precision register 14 (%f10) and the single precision register 14 (%f11) does not contain necessary data, or else when it is intended that data be moved into the single precision register 14 (%f11) and the single precision register 14 (%f10) does not contain necessary data.

Figure 7:
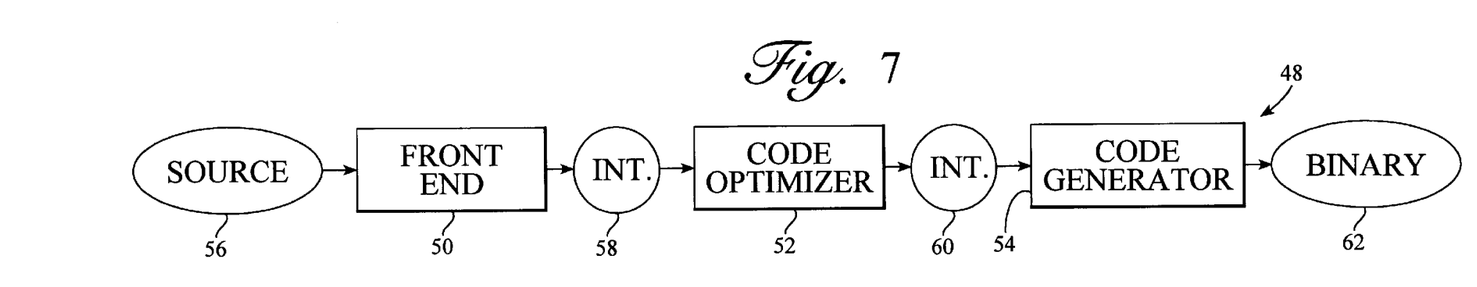
FIG. 7 is a block diagram of an optimizing compiler.

FIG. 7 illustrates a typical optimizing compiler 48, having a front end 50, a code optimizer 52 and a back end code generator 54. The front end 50 of the compiler 48 takes as input a source language program 56 (that is, a program written in a source language such as "C", or FORTRAN, or the like) and performs various lexical, syntactical and semantic analysis on the source language program 56, outputting a first intermediate code 58. The first intermediate code 58 is used as an input to the code optimizer 52 module, which attempts to improve the first intermediate code 58 to optimize the result according to the particular type of computer 10 on which the inventive float register spill cache method 20 is to be performed.

The code optimizer 52 outputs a second intermediate code 60 to the code generator 54 which converts the second intermediate code 60 into a binary program 62. The binary program 62 is that which is stored in and embodied as a medium which, in the present example, is the external memory device 13 of FIG. 3. The binary program 62 (embodied in any of the forms discussed previously herein in relation to the external memory device 13, or in essentially any other form in which programs can be physically stored) is, according to the present invention, such that the float register spill cache method 20 is accomplished when the binary program 62 is executed.

It should be noted that the optimizing compiler 48 will normally operate within a computer which is not necessarily the computer 10 within which the inventive float register spill cache method 20 is to be performed. As one skilled in the art will recognize, the usual situation is that code is compiled and then distributed in binary form to be run by a plurality of end users. Indeed, it is not required that the computer within which the optimizing compiler 48 operates be of the same type as the computer 10, or that the computer within which the optimizing compiler 48 operates be of a type which is capable of accomplishing the inventive float register spill cache method 20. Nevertheless, in the case of the best presently known embodiment 20 of the present inventive method, it is anticipated that code for performing and controlling the present inventive method will be compiled and then run on similar computers employing the SPARC architecture and, for purposes of the present simplified example, it will be assumed that the relevant code is to be both compiled and then, eventually, executed on the illustrated computer 10 of FIG. 3.

Figure 8:
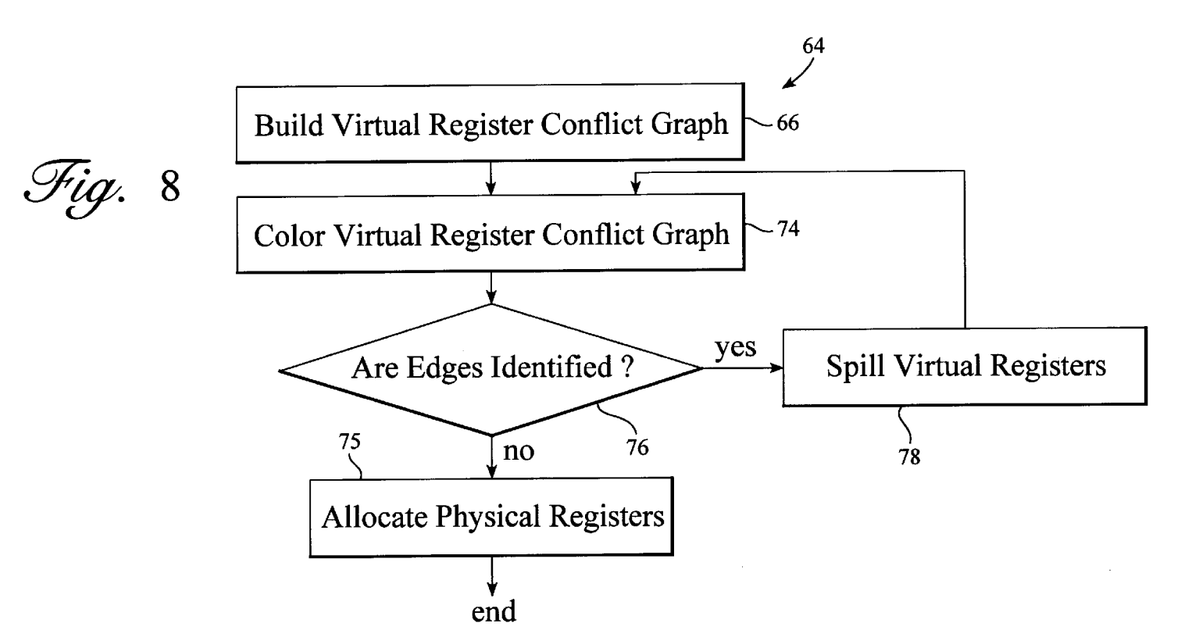
FIG. 8 is a block flow diagram of a portion of a code optimizer process in accordance with the present inventive method.

As previously discussed herein, and as is known to one skilled in the art, the code optimizer 52 performs several different functions in the optimizing compiler 48. FIG. 8 is block diagram of an optimizing compiler process 64. The optimizing compiler process 64 depicts so much of the code optimizer 52 (FIG. 7) as is pertinent to the discussion of the float register spill cache method 20, herein. In the optimizing compiler process 64, a build virtual register conflict graph 66 operation is accomplished according to the well known conventional method for accomplish a virtual register conflict graph 68 such as is depicted in the several diagrams of FIG. 9. Such methods are discussed in detail in a copending U.S. Pat. application Ser. No. 08/621,409, filed on Mar. 25, 1996, entitled *Method and System for Register Allocation Using Multiple Interference Graphs*, which copending application is incorporated herein by reference.

A first virtual register conflict graph 68a depicts an initial state of the virtual register conflict graph 68 just after a plurality of virtual "nodes" 70 are identified by the code optimizer 52. The nodes 70 are shown connected by a plurality of "edges" 72 (represented by the lines interconnecting the nodes in the diagram of FIG. 9). A discussion of the identification of the nodes 70 and the edges 72 is included, as a part of the disclosure of the prior art, in the U.S. Pat. No. 5,418,958 which was referenced previously herein. Briefly, the nodes 70 represent registers needed for the execution of the source program 56. In the greatly simplified example of the diagram of FIG. 9, there are four nodes 70 identified (designated as %v100 through %v103, inclusive), and four interconnecting edges 72. In the first virtual register conflict graph 68a, the nodes 70 are identified without regard for whether or not there are actual physical single precision registers 14 available to execute a series of single precision operations dictated by the source program 56. Returning again to the diagram of the code optimizer 52 of FIG. 8, the edges 72 are identified in a color virtual register conflict graph operation 74, according to the known method for coloring the virtual register conflict graph 68a. An edges identified decision operation 76 checks to see if any edges 72 remain. If no edges 72 remain then in an allocate physical registers operation 75, the code optimizer 52 will allocate the virtual nodes 70 to the available physical registers (which, in the present example, are the single precision registers 14).

Figure 9:
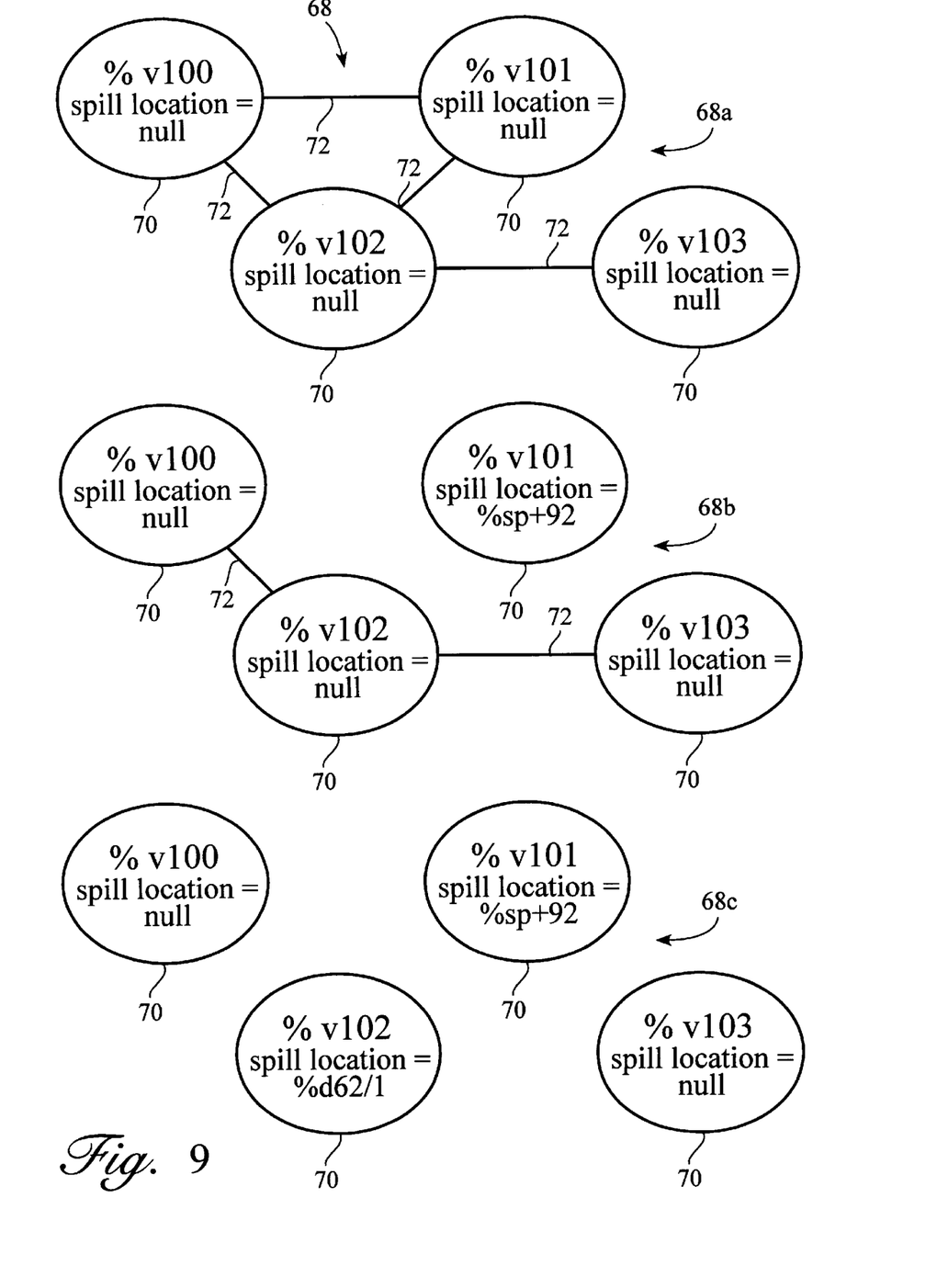
FIG. 9 is a virtual register conflict graph depicting several successive states of register allocation as nodes are assigned to registers in the performance of the method depicted in FIG. 7.

From the edges identified decision operation 76, if there are edges 72 in the virtual register conflict graph 68 (as there are, in the example of the first virtual register conflict graph 68a of FIG. 9). then operation of the code optimizer 52 proceeds to a spill virtual register operation 78. For purposes of comparison, it will be assumed in the example of FIG. 9, that the node 70 designated as %v101 is assigned to be spilled, in the conventional manner, to a memory location %sp+92 and the operation of the code optimizer 52 returns to the color virtual register conflict graph operation 74 which then produces a second virtual register conflict graph 68b, as depicted in the view of FIG. 9. It should be noted that this is the example previously set forth herein in relation to conventional prior art register spilling. In the code optimizer 52, as compared to the previous discussion herein of register spilling, the single precision registers 14 are not (necessarily) actually being spilled during the running of the optimizing compiler 48. Rather, the instructions which were previously disclosed herein are being inserted such that the binary program 62 which results from the optimizing compiler 48 will actually spill registers.

Since, as can be seen in the diagram of FIG. 9, after the node 70 %v101 is spilled and the second virtual register conflict graph 68b is colored in the color virtual register conflict graph operation 74, the allocate physical registers operation 75 will still be unable to instantly allocate all of the nodes 70 to the single precision registers 14 (since, as can be seen in the second virtual register conflict graph 68b, edges remain) and the edges identified decision operation 76 will route flow of the code optimizer 52 to the spill virtual register operation 78. In the example of FIG. 9, unlike the conventional prior art spill previously discussed, this second iteration of the spill virtual register operation 78 will insert the spill operation 26 (FIG. 2) instruction, previously set forth in detail herein, to spill the node 70 %v102 to the first undivided half of the float spill slot 24 %d62 (FIG. 3). This will result in the third register conflict graph 68c which has no remaining edges 72, such that the edges identified decision operation 76 will cause the code optimizer 52 to end. Actually, when the code optimizer 52 will be performing other functions not related to the present invention, the code optimizer 52 will then go on to accomplish such other functions. The "end" referred to here is merely an end to those portions of the code optimizer 52 which are illustrated in the example of FIG. 9. It should also be understood that the code optimizer 52 will, in actual practice, generally be accomplishing many iterations of the insertion of the instructions previously discussed herein for accomplishing the inventive spill operation 26, and also for accomplishing the inventive retrieve operation 28, during the conversion of the source program 56 into the binary program 62. Therefore, the operations of the code optimizer 52 illustrated in relation to FIG. 9 are but examples of the insertion by the optimizing compiler 43, of some of the instructions previously discussed herein in relation to the best presently known embodiment 20 of the present inventive method.

As can be appreciated by one skilled in the art, the code optimizer 52 will operate, according to the present invention, in a manner not greatly unlike prior art code optimizers. The code optimizer 52 will simply have available the float spill cache 22 as potential locations to which to spill the single precision registers 14, in addition to the conventional memory stack 18. The question of which of the spill slots 24 may be available at any given instant is tracked according to the conventional prior art methods for keeping track of any and all resources which are instantly available. When the code optimizer 52 determines, according to such prior art methods, that it is appropriate to spill one of the single precision registers 14 to a spill slot 24, then the instructions previously described in relation to FIG. 2 for accomplishing the inventive spill operation 26 are inserted. Similarly, when data which is stored in one of the spill slots 24 is required by the computer 10, then instructions for accomplishing the retrieve operation 28 are inserted such that the resultant binary program 62 will accomplish the present inventive method 20. When the criteria previously discussed herein in relation to FIG. 4 and FIG. 5 are present, then the instructions for the first optimized spill operation 26a or the second optimized spill operation 26b, respectively, may optionally be inserted by the code optimizer 52. When the criteria previously discussed herein in relation to FIG. 6 are present, then the instructions for the optimized retrieve operation 28a may optionally be inserted.

In the example specifically discussed previously herein in relation to FIG. 9, it was assumed that only single precision operations were being accomplished. In some instances, as discussed herein, it will be either necessary, or at least advantageous, to keep track of which single precision registers 14 and/or float spill slots 24 are not already being utilized to hold another program value. This is not an issue in the case of a purely single precision program. For mixed precision programs, multitasking, multithreading, and the like, it will be necessary to work around a portion of the double precision registers 16 which are already being used. Whenever any of the "second set" of double precision registers 16 (those numbered %d32 through %d62) is not live, it is free to be utilized as a float spill slot 24. As one example, each spill slot 24 might be annotated with information detailing the part of a program within which it is free for use.

As previously discussed herein, the present invention will result in improved performance as compared to the spilling of floating-point registers to external memory. In the case of spilling to the float spill cache, there is no memory involved. Both the save 26 and retrieve 28 operations are performed entirely within a SPARC V9 CPU. This removes a dependency on the memory system whenever the float spill cache can be utilized. Cutting the dependency frees the memory system to handle other memory read or write requests. If memory caching mechanisms are employed by the memory system, it eliminates detrimental memory cache state changes caused by spills and reloads from memory. Use of memory is never faster than real registers and often is significantly slower.

Since the float register spill cache method 20 of the present invention may be readily integrated into existing compiler optimization systems and devices, and since the advantages as described herein are provided, it is expected that it will be readily accepted in the industry. For these and other reasons, it is expected that the utility and industrial applicability of the invention will be both significant in scope and long-lasting in duration.

Various modifications may be made to the invention without altering its value or scope. For example, if future architecture designs provide for registers having greater than double precision then the present inventive method could be modified to take full advantage of those, as well.

Yet another likely modification would be to include additional optimization techniques. For example, it might be that in certain circumstances both of the single precision registers 14 in the spill pad 30 could be loaded before the values in the spill pad 30 would be moved to a float spill slot 24. This would greatly reduce the number of moves required in such a situation.

Still another modification would be to use the inventive float register spill cache method 20 is applications where single precision operations are accomplished in programs other than compiled programs.

This invention may be conveniently implemented using a conventional general purpose digital computer or microprocessor programmed according to the teachings of the present specification, as will be apparant to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical disks, CD-ROMs, and magneto-optical disks, ROMS, RAMS, EPROMS, EEPROMS, magnetic or optical cards, or any type of media suitable for storing electronic instructions.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

I claim:

1. A computer system having a central processing unit (CPU) and a random access memory coupled to the CPU, for use in compiling a target program to run on a target computer architecture having a fixed number of low precision registers and a fixed number of high precision registers, a selected number of the fixed number of low precision registers forming a spill pad, a selected number of the fixed number of high precision registers forming a spill slot, the computer system comprising:

a compiler system resident in said computer system having a front end compiler, a code optimizer and a back end code generator, wherein said code optimizer is configured to insert instructions in the target program to spill the low precision registers to the high precision registers through the spill pad and the spill slot.

2. The computer system of claim 1, wherein:

the instructions to spill the low precision register to the high precision registers include an instruction to move data from the low precision register to the spill pad and an instruction to move data from the spill pad to the spill slot.

3. The computer system of claim 2, wherein:

the spill pad is designated one of the low precision registers and associated with a corresponding one of the high precision registers in the spill slot.

4. The computer system of claim 1, wherein:

the low precision registers of the spill pad each coincide with half of a high precision register in the spill slot.

5. The computer system of claim 1, wherein:

said instructions to spill the low precision registers to the high precision registers include a first instruction to move data from a first low precision register to a selected plurality of the low precision registers in the spill pad and a second instruction to move data from the selected plurality of low precision registers to one of the high precision registers.

6. A computer system having a central processing unit (CPU) and a random access memory coupled to the CPU, for use in compiling a target program to run on a target computer architecture having a fixed number of low precision registers and a fixed number of high precision registers, a portion of the low precision registers forming a spill pad, a portion of the high precision forming a spill slot, the computer system comprising:

a compiler system resident in said computer system having a front end compiler, a code optimizer and a back end code generator; and wherein said code optimizer is configured to insert instructions in the target program to spill the low precision registers to the high precision registers, wherein said instructions to spill the low precision registers to the high precision registers include a first instruction to move data from a first low precision register to a selected plurality of the low precision registers in the spill pad and a second instruction to move data from the selected plurality of low precision registers to one of the high precision registers, and the compiler system further inserts an instruction between the first instruction and the second instruction to move data from the one high precision register to the selected plurality of low precision registers and then to a second single precision register.

7. A computer system, having a central processing unit (CPU) and a random access memory coupled to the CPU, for use in compiling a target program to run on a target computer architecture having a fixed number of low precision registers and a fixed number of high precision registers, a selected number of the fixed number of low precision registers forming a spill pad, a selected number of the fixed number of high precision registers forming a spill slot, the computer system comprising:

a compiler system resident in said computer system having a front end compiler, a code optimizer and a back end code generator, wherein said code optimizer is configured to insert instructions in the target program to spill the low precision registers to the high precision registers wherein said code optimizer is further configured to insert instructions in the target program to retrieve data from the high precision registers to the low precision registers.

8. An allocated computer register set enabled by computer program code, comprising:

a plurality of single precision registers;

a plurality of double precision registers configured to act as temporary data locations for said single precision registers; and at least one spill pad having a pair of single precision registers capable of acting together as a double precision register, said spill pad being an adjacent pair of said single precision registers, wherein data is moved from one of said plurality of single precision registers to said spill pad, and then from said spill pad to one of said double precision registers.

9. The allocated computer register set of claim 8, wherein:

said spill pad is an adjacent pair of said single precision registers.

10. A method for moving data in a computer having a fixed number of low precision registers and a fixed number of high precision registers, a selected number of the fixed number of low precision registers forming a spill pad, a selected number of the fixed number of high precision registers forming a spill slot, comprising:

a) spilling data from the low precision register to the high precision register; and b) retrieving data from said high precision register to said low precision register wherein step a includes:

a move value to spill pad operation wherein data is moved from one of the low precision registers to the spill pad; and a spill to spill slot operation wherein data is moved from the spill pad to the spill slot.

11. The method of claim 10, wherein:

the spill pad is a selected pair of the low precision registers; and the spill slot is a selected high precision register associated with the selected pair of the low precision registers.

12. The method of claim 10, wherein:
prior to step a), data is moved from the spill slot to the spill pad.

13. The method of claim 10, wherein:
said low precision register is a single precision floating point register; and
said high precision register is a double precision floating point register.

14. A method for moving data in a computer having a low precision register and a high precision register comprising:
a) spilling data from the low precision register to the high precision register; and
b) retrieving data from said high precision register to said low precision register
wherein step b includes:
a retrieve from spill slot operation wherein data is moved from a spill slot to a spill pad; and
a retrieve from spill pad operation wherein data is moved from a spill pad to a low precision register.

15. The method of claim 14, wherein:
the spill pad is a selected pair of low precision registers; and
the spill slot is a selected high precision register.

16. A method for moving data in a computer having a low precision register and a high precision register comprising:
a) spilling data from the low precision register to the high precision register; and
b) retrieving data from said high precision register to said low precision register
wherein step b includes:
a move from spill slot to register operation wherein data is moved directly from the spill slot to a low point register, the spill slot being a high precision register.

17. A method for moving data in a computer having a fixed number of low precision registers and a fixed number of high precision registers, a selected number of the fixed number of low precision registers forming a spill pad, a selected number of the fixed number of high precision registers forming a spill slot, the method comprising:
a) spilling data from the low precision register to the high precision register; and
b) retrieving data from said high precision register to said low precision register
wherein step a includes:
a move value to spill slot operation wherein data is moved directly from a low precision register to a high precision register.

18. An allocated computer register set enabled by computer program code, comprising:
a plurality of single precision registers;
a plurality of double precision registers configured to act as temporary data locations for said single precision registers; and
at least one spill pad having a pair of single precision registers capable of acting together as a double precision register, said spill pad being an adjacent pair of said single precision registers, wherein said spill pad is an adjacent pair of said single precision registers.

19. A computer program product, comprising:
a computer storage medium and a computer program code mechanism embedded in the computer storage medium for causing a computer increase the execution speed of a target computer program, the computer program code mechanism comprising:
a first computer code device configured to determine when virtual registers need to be spilled, said virtual registers comprising said at least one of said low precision registers; and
a second computer code device configured to spill virtual registers to the high precision register through the spill pad and the spill slot.

* * * * *